United States Patent
Liu et al.

(10) Patent No.: US 8,103,462 B2
(45) Date of Patent: Jan. 24, 2012

(54) OIL CONSUMPTION MONITORING FOR AIRCRAFT ENGINE

(75) Inventors: Jun Liu, Hartford, CT (US); Paul J. Vasques, Middletown, CT (US)

(73) Assignee: United Technologies Corporation, Hartford, CT (US)

(*) Notice: Subject to any disclaimer, the term of this patent is extended or adjusted under 35 U.S.C. 154(b) by 900 days.

(21) Appl. No.: 11/977,461

(22) Filed: Oct. 25, 2007

(65) Prior Publication Data

US 2009/0107771 A1 Apr. 30, 2009

(51) Int. Cl.
*G01M 15/09* (2006.01)
(52) U.S. Cl. .............. 702/55; 702/47; 702/50; 73/291
(58) Field of Classification Search .............. 702/47, 702/50, 55; 73/291
See application file for complete search history.

(56) References Cited

U.S. PATENT DOCUMENTS

| | | | |
|---|---|---|---|
| 4,215,412 A | 7/1980 | Bernier et al. | |
| 4,683,851 A | 8/1987 | Henneberry | |
| 4,722,666 A | 2/1988 | Dennison et al. | |
| 4,741,152 A | 5/1988 | Burr et al. | |
| 4,947,963 A | 8/1990 | Aho, Jr. | |
| 5,408,412 A | 4/1995 | Hogg et al. | |
| 5,610,341 A | 3/1997 | Tortora | |
| 6,138,081 A | 10/2000 | Olejack et al. | |
| 6,466,858 B1 | 10/2002 | Adibhatla et al. | |
| 7,313,467 B2 | 12/2007 | Breed et al. | |
| 2004/0079150 A1* | 4/2004 | Breed et al. | 73/291 |
| 2007/0209434 A1 | 9/2007 | Peters | |
| 2008/0103703 A1* | 5/2008 | Tichborne et al. | 702/51 |

* cited by examiner

*Primary Examiner* — Sujoy Kundu (74) *Attorney, Agent, or Firm* — Kinney & Lange, P.A.

(57) ABSTRACT

A system and method for accurately calculating the oil quantity and oil consumption rate of an aircraft engine detects the level of oil in an oil tank, calculates the oil quantity in the oil tank by compensating for the acceleration of the aircraft, as well as changes in the pitch, yaw and roll of the aircraft. The oil consumption rate of the aircraft is also calculated by calculating the oil quantity at different times, and dividing the difference in oil quantity by the difference in times. The percentage change in oil consumption of the aircraft engine is also calculated. The oil quantity and oil consumption rate can be reported during and after the aircraft's flight.

20 Claims, 5 Drawing Sheets

OIL CONSUMPTION MONITORING FOR AIRCRAFT ENGINE

STATEMENT OF GOVERNMENT INTEREST

The U.S. Government may have certain rights in this invention pursuant to Contract No. N00019-02-C-3003 awarded by the United States Navy.

BACKGROUND

Automatic oil consumption monitoring is desirable for aircraft engines so that the status of oil consumption before, during and after an aircraft flight can be monitored. Traditionally, oil consumption by aircraft engines has been monitored using an Oil Level Sensor (OLS) to estimate the level of oil remaining in the oil tank. This method of monitoring oil consumption is problematic because, during an aircraft flight, the oil level inside of the oil tank can vary significantly due to changes in acceleration and orientation of the aircraft. Thus, simply monitoring the oil level in the oil tank may not be an accurate measurement of oil consumption by the aircraft engine. In some cases, inaccurate measurement of oil consumption and oil level can result in a false alarm to a pilot or maintenance person by incorrectly indicating an oil leak during a flight, resulting in an unnecessary abort of the mission.

Therefore, there is a need for a more accurate method to estimate the amount of oil in the oil tank of an aircraft while in the air, and thereby more accurately determine the oil consumption of the aircraft engine.

BRIEF SUMMARY OF THE INVENTION

The invention is a system and method to accurately determine the oil consumption of an aircraft engine. The invention accurately determines the Oil Quantity (OQ) remaining in the oil tank by sensing the level of oil in the oil tank and then compensating that measurement for the oil tank geometry, the acceleration of the aircraft, and the orientation of the aircraft. The Oil Consumption Rate (OCR) is calculated using multiple OQs determined at different times and dividing the difference in those oil quantities by the difference in time. The percentage change in the Oil Consumption Rate ($\Delta$OCR %) is calculated by dividing the difference between the actual and nominal OCR over a period of time by the nominal OCR over that period of time.

DETAILED DESCRIPTION

The invention calculates the oil quantity and the percentage of change in the oil consumption rate of an aircraft engine. Use of the invention helps to detect oil leaks promptly, and also helps to detect high oil consumption and/or low oil quantity during and after an aircraft flight. Internal oil leaks can be detected automatically, and by tracking the Oil Consumption Rate, the amount of time remaining before an oil tank becomes empty during an aircraft flight can be predicted. This allows the pilot enough time to take action if an oil leak is detected during the flight of an aircraft. In addition, proper calculation of the oil quantity and oil consumption rate is useful for maintenance purposes, because it helps to accurately calculate the amount of time before routine oil service is necessary. Finally, leak detection utilizing the invention has a low rate of false alarms because aircraft acceleration and orientation are considered in estimating the oil quantity and oil consumption rate.

Figure 1:
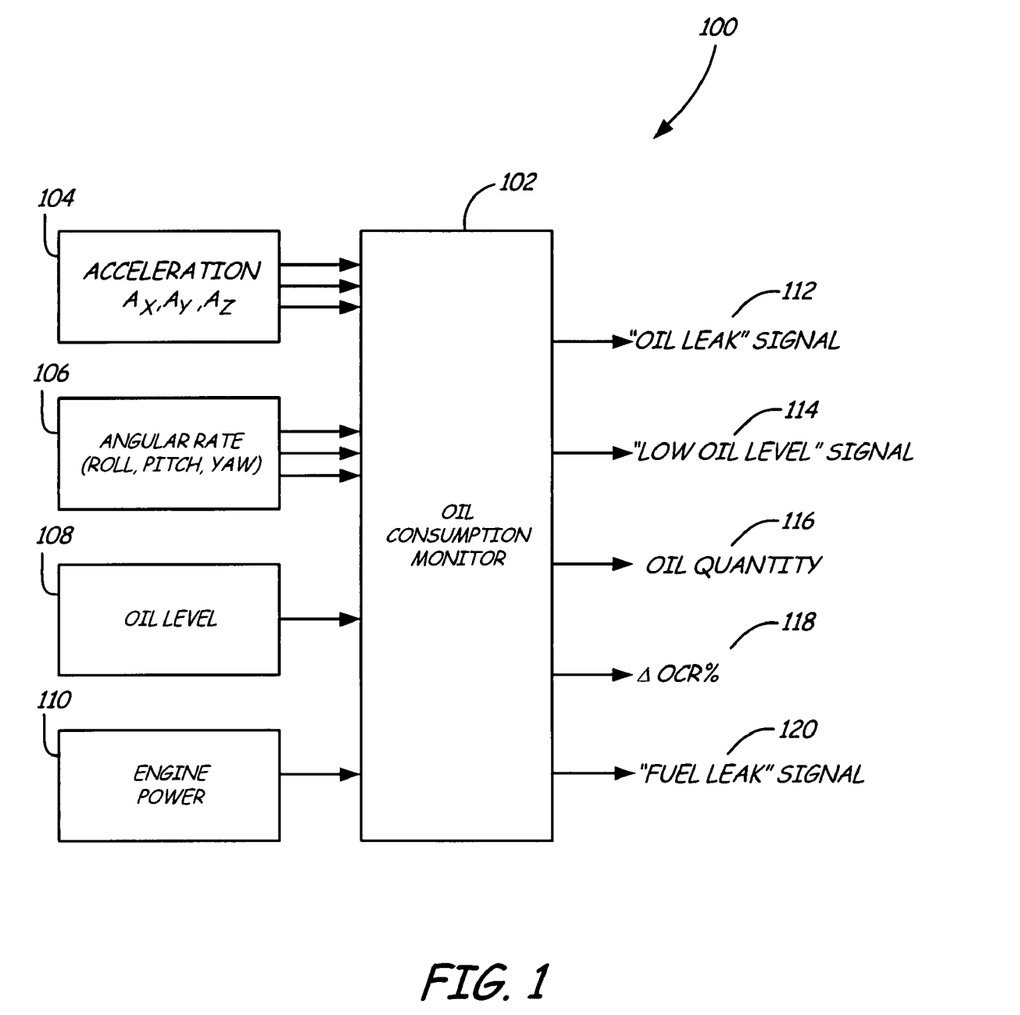
FIG. 1 is a block diagram showing the components of an embodiment of the invention.

FIG. 1 is a block diagram 100 showing the components of the invention. Oil consumption monitor 102 receives inputs from sensors located in various parts of the aircraft. The inputs include three inputs 104 ($A_x$, $A_y$ and $A_z$) for the acceleration of the aircraft; three inputs 106 ($\dot{\theta}$, $\dot{\phi}$, $\dot{\psi}$) for the angular rate of the roll, pitch and yaw of the aircraft, input 108 for the oil level in the oil tank of the aircraft measured by the oil level sensor (OLS), and input 110 for the engine power setting ($N_2$).

Figure 2:
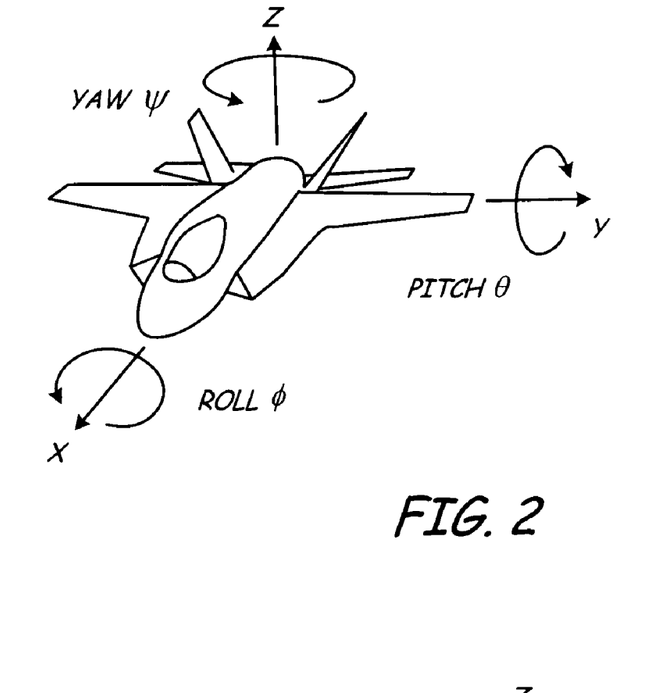
FIG. 2 is a flow diagram showing the steps of an embodiment of the invention.

The aircraft's acceleration is obtained in the form of the vector ($A_x$, $A_y$ and $A_z$). Aircraft acceleration is measured in distance per second$^2$ and is acquired at least once per second. The aircraft's angular rate is obtained as the vector ($\dot{\theta}$, $\dot{\phi}$, $\dot{\psi}$), which corresponds to the rates of change in the roll, pitch and yaw of the aircraft. FIG. 2 shows the definitions of roll, pitch and yaw and corresponding angles $\theta$, $\phi$ and $\psi$. The aircraft's angular rates of change in roll, pitch and yaw are measured in radians per second and are acquired at least once per second. Oil level, indicating the height of the oil in the oil tank is measured in inches and is collected at least once per second. The engine power setting ($N_2$) is measured in revolutions per minute (rpm) and is acquired at least once per second. All input variables mentioned above are measured as time sequences and indexed by k.

Oil consumption monitor 102 receives these inputs, and produces an appropriate output. Outputs may include warnings such as "OIL LEAK" signal 112 or "LOW OIL LEVEL" output 114 or "FUEL LEAK" output 120. Oil consumption monitor 102 may also calculate and output the Oil Quantity 116 in the tank of the aircraft or the percentage change in the oil consumption rate ($\Delta$OCR %) 118 of the aircraft. Outputs 112, 114, 116, 118 and 120 are exemplary. The number and nature of the outputs of oil consumption monitor 102 will vary under different circumstances, depending on the status of the engine and the output desired by the users.

Figure 3A:
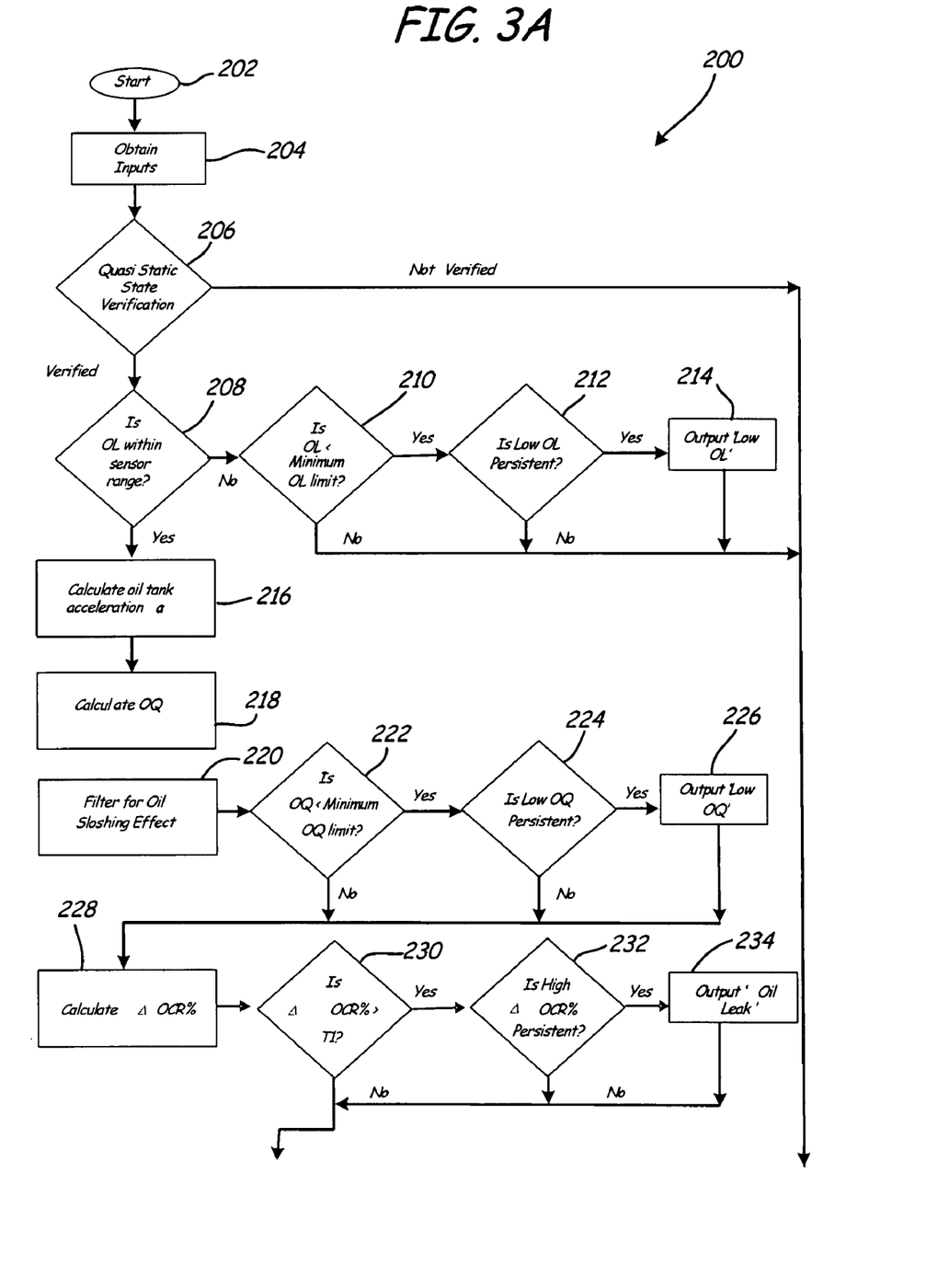
FIG. 3 is a diagram showing an aircraft coordinate system as used in the invention.
Figure 3B:
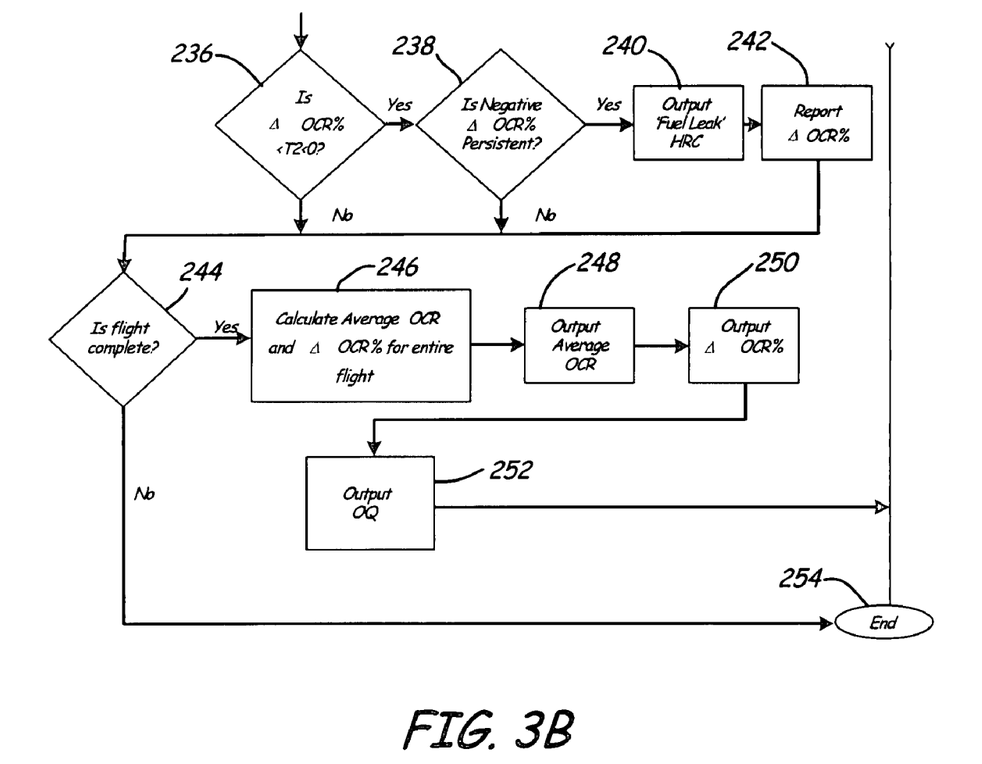

FIG. 3 is a flow diagram 200 demonstrating the steps of the invention performed by oil consumption monitor 102, which may, for example, be a microprocessor. The process begins at start box 202. The process then moves on to step 204, at which necessary data is obtained. This data includes the aircraft's acceleration, the aircraft's angular rate, the oil level and the engine power setting.

After data has been obtained in step 204, the process moves on to question box 206, where the aircraft's quasi-static state is verified. This step is taken to avoid inaccurate oil quantity estimates during rapid aircraft maneuver or the inability of the OLS to sense the oil level in situations such as extreme acceleration, deceleration or attitude. The extreme attitude may include, but is not limited to, straight up/down or upside down flight. To satisfy a quasi static state, the aircraft acceleration ($A_x$, $A_y$, $A_z$) and angular rate ($\dot{\theta}$, $\dot{\phi}$, $\dot{\psi}$) have to be within a certain range. If the aircraft's quasi-static state is verified, the process proceeds to 208; if not, the process ends at end box 254.

Question box 208 determines whether the oil level is within the range of the oil level sensor. With the previous quasi-static state check passed, the OLS should be able to sense the oil level in the tank, if the oil quantity in the oil tank is in operational range. If this is the case, the process moves on to next step 216. If the oil level is not within the sensor range, then a new validation check is performed at step 210, which determines if the oil level is below the minimum oil level limit.

If the validation check at step 210 reveals that the oil level is indeed below the minimum oil level limit, a persistency check at step 212 is performed. Step 212 determines whether the oil level is persistently below the minimum oil level limit for a given period of time. If so, then the process generates a 'Low OL' Health Report. Code (HRC) at step 214. If the validation check at step 210 reveals that the oil level is not below the minimum oil level limit (it must be beyond the maximum oil level limit in this case), or the persistent check in step 212 fails, the process stops for the current data input and ends at end box 254.

If the oil level is within sensor range at step 208, the process moves on to box 216, where the process calculates the acceleration for the oil tank. The acceleration at oil tank is a composition of the aircraft acceleration and the centripetal acceleration introduced by the aircraft's rotation along pitch, roll, and yaw. Calculation of acceleration of the oil tank may also include compensation for the difference between the aircraft coordinate system and the oil tank coordinate system. Taking into account the relationship between the aircraft coordinate system and the oil tank coordinate system results in a more accurate calculation of oil quantity, because it compensates for the difference between the location of the oil tank and the device that provides the aircraft's acceleration and attitude data.

Figure 4:
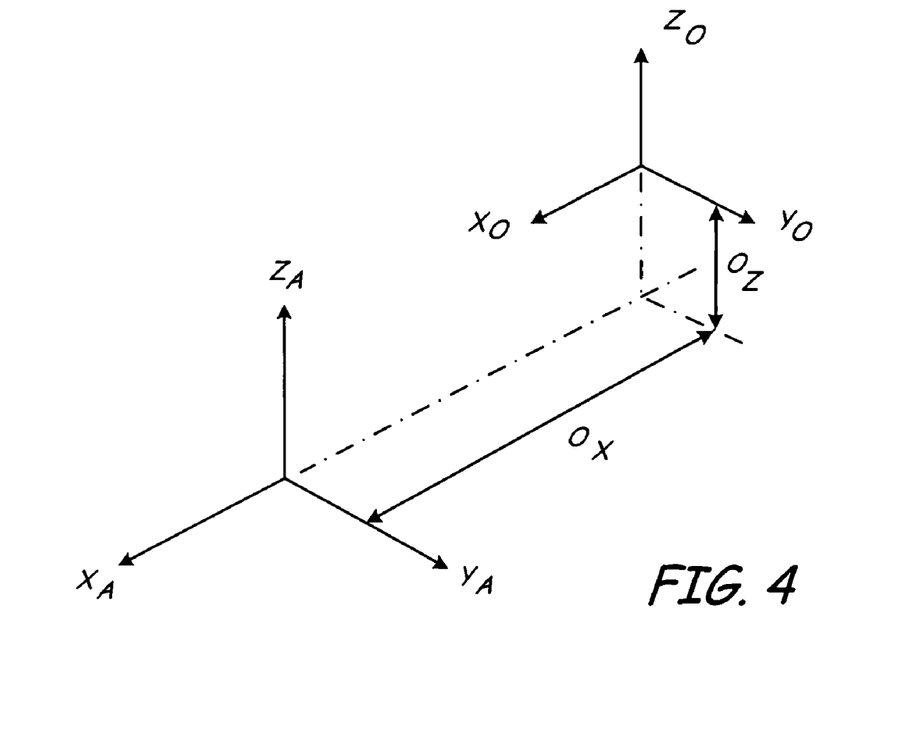
FIG. 4 is a diagram showing the relationship between the aircraft coordinate system and oil tank coordinate system.

FIG. 4 is a graphical representation showing both the aircraft coordinate system, $\{x_A, y_A, z_A\}$, and the oil tank coordinate system, $\{x_O, y_O, z_O\}$. The distance between the aircraft coordinate system and the oil tank coordinate system yields the parameters $O_x$, $O_y$, and $O_z$, where $O_y$ is usually zero.

Calculation of the acceleration, which is a vector $a=\{a_x, a_y, a_z\}$, is calculated using the following equation:

$$\begin{cases} a_x = A_x + \dot{\theta}^2 \cdot O_x + \dot{\psi}^2 O_x = A_x + (\dot{\theta}^2 + \dot{\psi}^2)O_x \\ a_y = A_y \\ a_z = A_z - \dot{\theta}^2 O_z - \dot{\phi}^2 O_z = A_z - (\dot{\theta}^2 + \dot{\phi}^2)O_z \end{cases}$$

Figure 5:
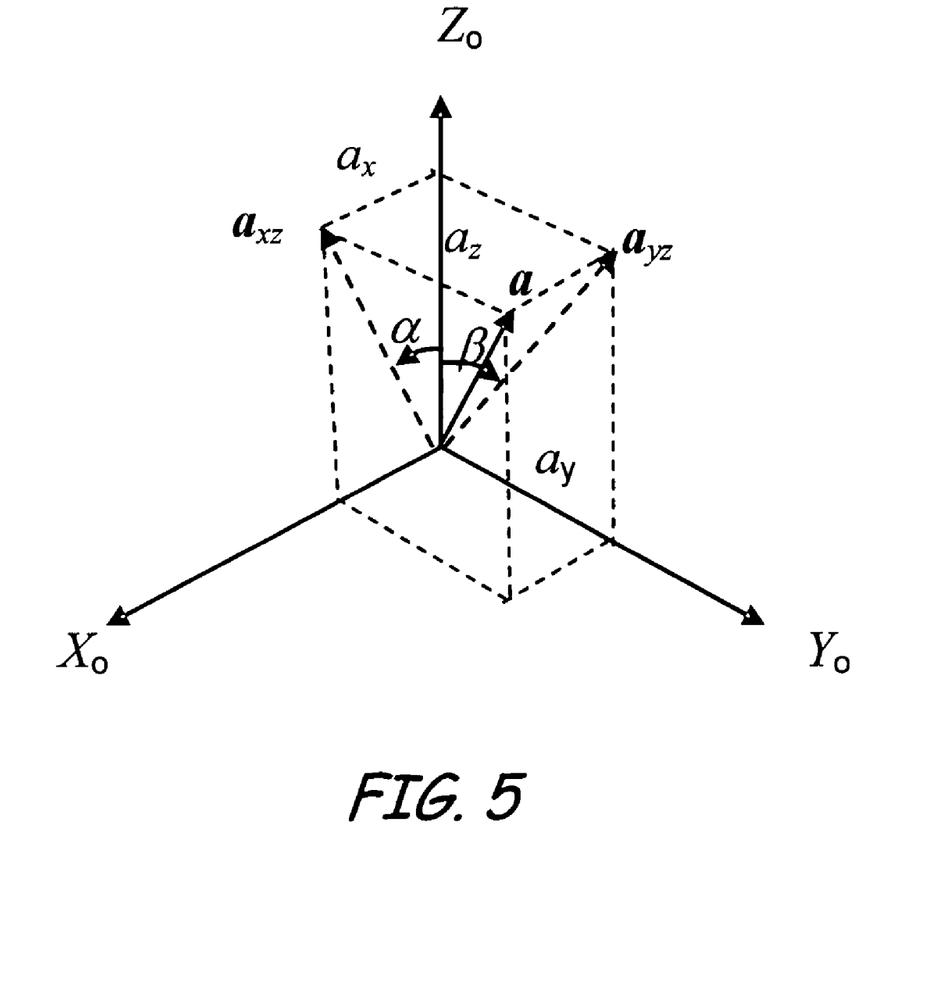
FIG. 5 is a diagram showing the definition of $\alpha$ and $\beta$ as used in an embodiment of the invention.

After calculating the acceleration, the process moves on to step 218 of FIG. 3, in which the oil quantity (OQ) is calculated. The oil quantity is calculated by compensating the oil level in the tank with the acceleration calculated in step 216. First, the pitch angle ($\alpha$) and the roll angle ($\beta$) of the acceleration vector a relative to the oil tank coordinate system are calculated. FIG. 5 is a graphical representation showing the definition of $\alpha$ and $\beta$ where $\alpha$ is defined as the angle from the $Z_o$ axis to the projection vector $a_{xz}$ of a onto the x-z plane, and $\beta$ is defined as the angle from the $Z_o$ axis to the projection vector $a_{yz}$ of a onto the y-z plane. The pitch $\alpha$ and the roll angle $\beta$ are calculated using following equations:

$$\begin{cases} \alpha = \arctan(a_x/a_z) \\ \beta = \arctan(a_y/a_z) \end{cases}$$

Oil quantity is calculated using the following conversion function:

$$OQ = f(OL, \alpha, \beta).$$

The conversion function $f$ may be established in two different ways. The first option is to use a Conversion Table that specifies the oil quantity for each given combination of the oil level, pitch angle and roll angle. Utilizing this option, the Conversion Table is searched for the nearest match in oil level, pitch angle, and roll angle readings, and then the oil quantity is determined by the given oil quantity provided in the Conversion Table. Interpolation may be performed if there is no exact match for given oil level, pitch angle and roll angle. The second option is to establish an approximation function $f$ to represent the OQ as function of the oil level, pitch angle and roll angle. In either option, the data used to establish $f$ may be collected through experiments or generated from the digital model used to design the shape of the oil tank.

After calculating the oil quantity, the process moves on to step 220 of FIG. 3, which filters out the effect of oil moving around in the oil tank, commonly referred to as 'sloshing'. A low pass filter is applied to the oil quantity in order to eliminate the effect of oil sloshing, in the form of:

$$OQ_k = \mu \ast OQ_{k-1} + (1-\mu) \ast OQ_k, \ 0 < \mu < 1$$

where $OQ_k$ is the current oil quantity estimate, $OQ_{k-1}$ is the previous oil quantity estimation, and $\mu$ is an adjustable factor that determines how smoothly the filter effect should be applied.

After filtering the oil sloshing effect, the process moves on to step 222, which begins a low oil quantity check. If the current OQ is not below the minimum OQ limit, the process proceeds to step 228. However, if the current OQ is below the minimum OQ limit, which indicates that an immediate oil service is needed, the process moves into a persistency check at step 224. Step 224 determines whether the oil quantity is persistently below the minimum OQ limit for a given period of time. If so, then the process generates a 'Low OQ' HRC at step 226 and then moves on to step 228. If the validation check at step 222 reveals that the oil quantity is not below the minimum oil quantity limit, or the persistent check in step 224 fails, the process moves on directly to step 228.

During an engine run or an aircraft's flight, it may be useful to monitor the oil consumption rate. At step 228, the actual oil consumption rate at the time k is estimated as the difference between the oil quantity previously determined at n time intervals back and the current oil quantity, divided by the difference in time over the past n time intervals:

$$OCR_k^{actual} = (OQ_{k-n} - OQ_k)/(t_k - t_{k-n})$$

where $t_k$ and $t_{k-n}$ represent the times at k and k-n, respectively.

Then the nominal oil consumption rate for a healthy engine is calculated:

$$OCR_k^{nominal} = \sum_{i=k-n}^{k} g(N2_i) \times (t_i - t_{i-1})/(t_k - t_{k-n})$$

where g is the nominal oil consumption rate design curve as a function of the engine power setting. The nominal oil consumption rate design curve can be obtained from design experiments by measuring real engine consumption at varies power settings. Next, the percentage change in oil consumption rate (ΔOCR %) is calculated using the following equation:

$$\Delta OCR\,\%_k = (OCR_k^{actual} - OC_k^{nominal})/OCR_k^{nominal}$$

Following calculation of ΔOCR %, an oil consumption rate check is performed at question box 230 to determine whether ΔOCR % is higher than a threshold $T_1$, indicating high oil consumption rate. A persistency check is performed at step 232, and if the ΔOCR % is persistently higher than the threshold $T_1$ for a given period of time, an 'Oil Leak' HRC is generated at step 234. Question box 236 determines whether the oil consumption rate is lower than a negative threshold $T_2$, indicating negative oil consumption caused by fuel leaking into the lubrication system. A persistency check is performed at step 238, and if the ΔOCR % is persistently lower than the threshold $T_2$ for a given period of time, a 'Fuel Leak' HRC is generated at step 240. ΔOCR % is reported at step 242.

After the persistent check, the process moves into step 244 for an after-flight check. The after-flight check is performed at step 244. If, at current time, the flight status indicates the flight has not been completed, the current process stops and ends at end box 254. If the flight status indicates the flight is completed, the process proceeds to step 246 to generate the average oil consumption rate for the entire flight.

At step 246, the average of actual oil consumption rate representing the entire flight can be approximated as:

$$OCR^{actual} = \frac{1}{N}\sum_{k=1}^{N} OCR_k^{actual},$$

where N is total number of time intervals (seconds) the engine is operated in the flight. Furthermore, the average percentage change in oil consumption rate (ΔOCR %) representing the entire flight can be approximated as:

$$\Delta OCR\,\% = (OCR^{actual} - OCR^{nominal})/OCR^{nominal}$$

where the $OCR^{nominal}$ is the nominal oil consumption rate for the entire flight for a healthy engine, and calculated as:

$$OCR^{nominal} = \frac{1}{N}\sum_{k=1}^{N} OCR_k^{nominal}.$$

The actual oil consumption rate, $OCR^{actual}$, is reported at step 248, the percentage change in oil consumption rate, ΔOCR %, is reported at step 250 and the latest oil quantity OQ is reported at step 252. This data is reported to the ground processing system for long term tracking. The process ends at end box 254.

The invention accurately calculates the oil quantity in an aircraft oil tank and the oil consumption rate of an aircraft engine by taking into account the acceleration and the attitude of the aircraft. Oil quantity and oil consumption rate determined using the invention are more accurate than conventional measuring techniques. As a result, fewer incorrect false low oil warnings will be generated and aircraft maintenance personnel will have a more accurate determination of oil quantity and oil consumption rates for aircraft engines, resulting in more efficient maintenance of the engines.

Although the present invention has been described with reference to preferred embodiments, workers skilled in the art will recognize that changes may be made in form and detail without departing from the spirit and scope of the invention.

The invention claimed is:

1. A method for calculating an oil quantity in a tank of an aircraft, the method comprising:
    sensing oil level in the tank;
    sensing acceleration of the aircraft;
    sensing rates of change in orientation of the aircraft;
    calculating the acceleration of the tank by a processor using sensed acceleration of the aircraft and sensed rates of change in orientation of the aircraft; and
    calculating the oil quantity in the tank by compensating the sensed oil level to account for the acceleration of the tank.

2. The method of claim 1 wherein the rates of change in orientation of the aircraft include changes in a yaw rate, a pitch rate and a roll rate.

3. The method of claim 1 further comprising the step of adjusting the calculated oil quantity to account for sloshing of oil in the tank of the aircraft.

4. The method of claim 1 wherein the oil quantity is calculated and reported while the aircraft is in motion.

5. The method of claim 1 wherein the oil quantity is calculated and reported after the aircraft has ended its motion.

6. A method for calculating an oil consumption rate of an aircraft, the method comprising:
    sensing oil level in an oil tank at a first time;
    sensing acceleration of the aircraft at the first time;
    sensing changes in orientation of the aircraft at the first time;
    calculating the acceleration of the tank at the first time by a processor based on sensed acceleration of the aircraft at the first time and sensed changes in orientation of the aircraft at the first time;
    calculating the oil quantity in the tank at the first time by compensating the sensed oil level at the first time to account for the acceleration of the tank at the first time;
    sensing oil level in the tank at a second time;
    sensing acceleration of the aircraft at the second time;
    sensing changes in orientation of the aircraft at the second time;
    calculating the acceleration of the tank at the second time by the processor based on sensed acceleration of the aircraft at the second time and sensed changes in orientation of the aircraft at the second time;
    calculating the oil quantity in the tank at the second time by compensating the sensed oil level at the second time to account for the acceleration of the tank at the second time; and
    calculating the oil consumption rate by dividing a difference in calculated oil quantities at the first time and the second time by a difference between the first time and the second time.

7. The method of claim 6 wherein the changes in orientation of the aircraft include changes in a yaw rate, a pitch rate and a roll rate, which are sensed at all yaw, pitch and roll angles experienced by the aircraft.

8. The method of claim 6 further comprising the steps of adjusting the calculated oil quantities to account for sloshing of the oil in the tank of the aircraft.

9. The method of claim 6 further comprising:
    calculating a nominal oil consumption rate ; and
    calculating a percentage change in the oil consumption rate by dividing a difference in the oil consumption rate and the nominal oil consumption rate by the nominal oil consumption rate.

10. A system for monitoring oil consumption of an aircraft, the system comprising:
- means for sensing oil level in a tank of an aircraft;
- means for sensing acceleration of the aircraft;
- means for sensing rates of change in orientation of the aircraft; and
- means for calculating the acceleration of the tank using sensed acceleration of the aircraft and sensed rates of change in orientation of the aircraft and calculating oil quantity in the tank by compensating the sensed oil quantity level to account for the acceleration of the tank.

11. The system of claim 10 wherein the changes in orientation of the aircraft include changes in a yaw rate, a pitch rate and a roll rate, which are sensed at all yaw, pitch and roll angles experienced by the aircraft.

12. The system of claim 10 wherein the means for calculating adjusts the calculated oil quantity to account for sloshing of oil in the tank of the aircraft.

13. The system of claim 10 wherein the means for calculating calculates and reports the oil quantity while the aircraft is in motion.

14. The system of claim 10 wherein the means for calculating calculates and reports the oil quantity after the aircraft has ended its motion.

15. The system of claim 10 and further comprising:
- means for calculating oil consumption rate based upon calculated oil quantity at different times.

16. The method of claim 1, wherein the changes in the yaw rate, the pitch rate and the roll rate are sensed at all yaw, pitch and roll angles experienced by the aircraft.

17. The method of claim 1, and further comprising:
- outputting an oil leak signal based upon the calculated oil quantity.

18. The method of claim 1, and further comprising:
- outputting a fuel leak signal in response to the calculated oil quantity increasing.

19. The method of claim 6, and further comprising:
- outputting an oil leak signal based upon the calculated oil consumption rate.

20. The method of claim 6, and further comprising:
- outputting a fuel leak signal in response to the calculated oil consumption rate being lower than a threshold oil consumption rate.

* * * * *

UNITED STATES PATENT AND TRADEMARK OFFICE
CERTIFICATE OF CORRECTION

PATENT NO.        : 8,103,462 B2                                              Page 1 of 1
APPLICATION NO.   : 11/977461
DATED             : January 24, 2012
INVENTOR(S)       : Jun Liu et al.

It is certified that error appears in the above-identified patent and that said Letters Patent is hereby corrected as shown below:

Col. 7, Line 12
      Delete "quantity"

Signed and Sealed this
Sixth Day of March, 2012

David J. Kappos
*Director of the United States Patent and Trademark Office*